(No Model.)
M. G. HUBBARD.
AUTOMATIC UNWINDING ATTACHMENT.
No. 347,802. Patented Aug. 24, 1886.
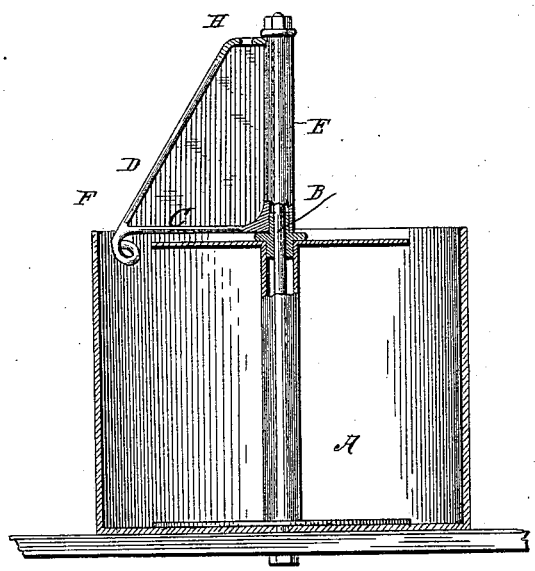
WITNESSES
Edwin I. Yewell,
D. P. Cowl
INVENTOR
Moses G. Hubbard
by Alex Mahon
Attorney

UNITED STATES PATENT OFFICE.

MOSES G. HUBBARD, OF PHILADELPHIA, PENNSYLVANIA.

AUTOMATIC UNWINDING ATTACHMENT.

SPECIFICATION forming part of Letters Patent No. 347,802, dated August 24, 1886.

Application filed January 14, 1886. Serial No. 188,569. (No model.)

*To all whom it may concern:*

Be it known that I, MOSES G. HUBBARD, of the city and county of Philadelphia, State of Pennsylvania, have invented certain new and useful Improvements in Automatic Unwinding Attachments, of which the following is a full and exact description, reference being had to the accompanying drawing, making part of this specification.

My invention relates to a device for unwinding twine, wire, or rope from a spool or ball held upon a fixed central support, whereby the action of the material is better controlled and the process of unwinding greatly facilitated; and my invention consists in the combination of a stationary support for the material, a revolving guide to travel by the action of the material thereon, a cylindrical case to surround the material, and an auxiliary guide for guiding the same, as hereinafter explained.

It further consists in certain details in the construction and arrangement of parts, all as hereinafter explained.

In the accompanying drawing I have shown a section of the cylindrical case with a spool upon the central support, with one end of said spool in section.

In said drawing, A represents the cylindrical case, secured to or mounted upon a suitable base or support, G, and affixed to the base is a stationary vertical rod having circular nuts or bearing mounted thereon, and to or upon which the spool carrying the material is mounted. The central rod or shaft extends up some distance beyond the edge of the cylindrical case, and has mounted upon it, adjacent to the outer disk of the spool, a revolving guide, C, said guide being loosely connected therewith, so as to be free to revolve independently of said support. The hub of the guide C is preferably made long, to provide a long bearing, and near its upper end is provided with an auxiliary guiding-eye, H, said hub being held in place upon the central support by means of a nut engaging a screw-thread cut on the upper end of the central support.

To make the arm G more firm and able to resist the strain thereon in drawing or jerking the material from the spool, a brace, D, is extended from the outer end of the hub to the outer end of the guide, as shown.

The operation of the device will be readily understood. The spool or ball being held fixed on the central support, the material is first passed through the eye in the revolving guide and thence to the auxiliary guide, and as it is desired to use the material by drawing upon the end the guide is caused to travel around the spool and unwind the material. When the material is drawn rapidly or jerked from the spool, causing the guide to revolve rapidly and then suddenly stop as the force or pull ceases, the cylindrical case serves to control the action of the material and prevent the same flying off by the action of the centrifugal force when said pull ceases.

I am aware that balls of twine have been held in cases, but in these no revolving guide was used. I am also aware that a revolving guide has been used to unwind thread from a spool; but, so far as I am aware, these two features have never been combined. In my construction I employ a stationary support with a revolving guide to travel by the action of the material thereon, combined with a cylindrical case, the cylindrical case serving to control the action of the material, as before stated.

Having now described my invention, I claim—

1. The combination of a stationary central support for the material, a revolving guide to travel by the action of the material thereon, a cylindrical case to surround the spool, and an auxiliary guide, substantially as and for the purpose set forth.

2. The combination of the extended shaft, the extended hub for carrying the guide for unwinding the material, and a second or auxiliary guide fixed to the outer end of the hub, substantially as and for the purpose set forth.

MOSES G. HUBBARD.

Witnesses:
ALEX. MAHON,
D. P. COWE.